US006618232B2

(12) United States Patent
Huang et al.

(10) Patent No.: US 6,618,232 B2
(45) Date of Patent: Sep. 9, 2003

(54) POWER LOCK DEVICE SAFE POWER SOURCE OUTPUT/INPUT

(75) Inventors: Min-Huang Huang, Taoyuan Hsien (TW); Her-Lin Chang, Taipei Hsien (JP)

(73) Assignee: DigiPower Manufacturing Inc., Taipei (TW)

( * ) Notice: Subject to any disclaimer, the term of this patent is extended or adjusted under 35 U.S.C. 154(b) by 0 days.

(21) Appl. No.: 09/836,417

(22) Filed: Apr. 18, 2001

(65) Prior Publication Data

US 2002/0154465 A1 Oct. 24, 2002

(51) Int. Cl.⁷ ................................................ H02H 3/00
(52) U.S. Cl. ..................................................... 361/93.2
(58) Field of Search .......................... 361/67, 68, 93.1, 361/93.2, 93.4, 93.9, 94

(56) References Cited

U.S. PATENT DOCUMENTS 6,011,328 A * 1/2000 Smith ........................ 307/139
6,049,045 A * 4/2000 Becker et al. ............ 200/51 R \* cited by examiner

*Primary Examiner*—Matthew V. Nguyen
(74) *Attorney, Agent, or Firm*—Bacon & Thomas, PLLC

(57) ABSTRACT

A power lock device for safe power output/input is a control lock composed of coding devices, decoding devices and electromagnetic switches. The coded signal will attach to the power transmitting line and keeps on transmitting. After discerning that the coded signal is correct, the decoding device turns on electromagnetic switches and conducts power to transmit. If the code is not correct, the decoding device uses the electromagnetic switches to cut off power and achieves the function of power control.

6 Claims, 5 Drawing Sheets

POWER LOCK DEVICE SAFE POWER SOURCE OUTPUT/INPUT

BACKGROUND OF THE INVENTION

1. Field of the Invention

The present invention relates to a power lock device for safe power source output/input. The device is a control lock using coded signals attached to the power line, and is a power lock for safe power source output/input which can avoid the accident of an electric shock resulted form moving an electric appliance haphazardly and carelessly insert an electric conduct into a socket.

2. Description of the Prior Art

The commonly seen power outlets, whereon several sockets have the only function of providing power, are set up at many places in a house. Sometimes, some sockets are not used and are very possible to become the origin of accident.

For the reason, the commonly seen power lock device, such as Taiwan Patent 306704 (hereafter, the cited case), is invented. The main characteristics of the commonly seen power lock device are: a power outlet which can receive power and is set on the wall or a positioned object, several sockets thereon for plugging in objects requiring power, a button switch for starting the control circuit in the socket and encode the control circuit to make the socket ready for use. Main disadvantages of the construction are: for the commonly seen power lock, a switch is equipped on the common outlet and controls whether the outlet is ready for use or not by the setting of the switch. In other word, the power lock controls whether power is conducted into the outlet by the only way of connecting the outlet with the switch. In this way, if the user carelessly insert an electric conductor into the socket as the outlet is ready for use, an accident of an electric shock may happen.

Therefore, the commonly seen object described above has many disadvantages and is really not a perfect design requiring been improved.

The inventor of the invention ruminated over the disadvantages resulted from the commonly seen outlet and the power lock device described above. After studying hard for a long period, the inventor finally succeed in inventing the power lock device for safe power output/input.

SUMMERY OF THE INVENTION

The purpose of the present invention is to provide a power lock device for safe power output/input to avoid the accident of an electric shock resulted from inserting an electric conduct into the socket.

The second purpose of the present invention is providing a power lock device for safe power output/input to cut the power of the socket immediately when an electric appliance departs from the socket.

The other purpose of the present invention is providing a power lock device for safe power output/input for to avoid the condition that a electric appliance is moved haphazardly and also can limit danger electric appliances under usage to some specified places.

The power lock device for safe power output/input that can achieve the purposes mentioned above comprises a power supply end and a power receiving end. The power supply end comprises a power circuit, an overload detector, a microprocessor, a signal dividing circuit, and a low power supply. The function of the power circuit is to transform alternating current into direct current, which is supplied to the components requiring direct current.

The function of the overload detector is to detect if there is an overload in the power transmission line. If there is an overload in the power transmission line, the overload detector will transmit a signal to inform the microprocessor.

The function of the low power supply is to output a safe low voltage, which is supplied to the components of the power-receiving end.

One function of the signal dividing circuit is to detect the coded signal attached to the power line by the way of analog or digital regulation to check if an electric appliance is under using and transmit the coded signal, which has been analyzed, to the microprocessor to contract. The other function of the signal dividing circuit is to attach the coded signal from the microprocessor to the power line.

The function of the microprocessor is to receive and analyze the signal from the overload detector and signal dividing circuit to control transmission of power.

The power receiving end contains a power circuit, a microprocessor, and a signal dividing circuit. The function of the power circuit is to transform the power of the power line such that the components inside the power receiving end can use the transformed power.

One function of the signal dividing circuit is to detect the coded signal attached to the power line by the way of analog or digital regulation to check if an electric appliance is under using and transmit the coded signal, which has been analyzed, to the microprocessor to contract. The other function of the signal dividing circuit is to attach the coded signal from the microprocessor to the power line.

The functions of the microprocessor are to set a code, contract a code, and control supply of power. After the code is identified, the safe low voltage is turned off.

BRIEF DESCRIPTION OF THE DRAWINGS

The drawings disclose an illustrative embodiment of the present invention, which serves to exemplify the various advantages and objects hereof, and are as follows.

DIAGRAM REMARKS

Figure 1:
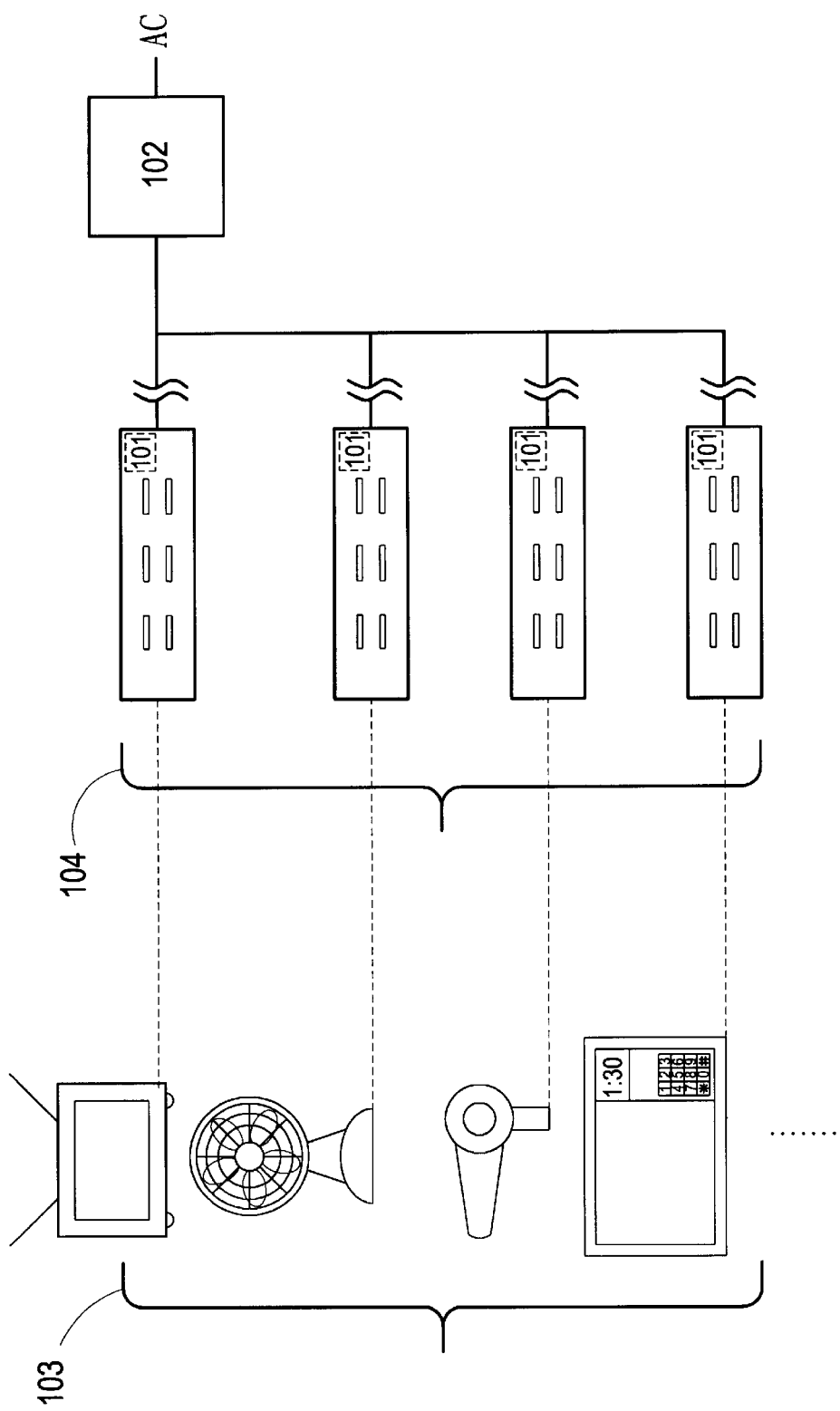
FIGS. 1A, B Schematic diagram of the present invention.
Figure 1:
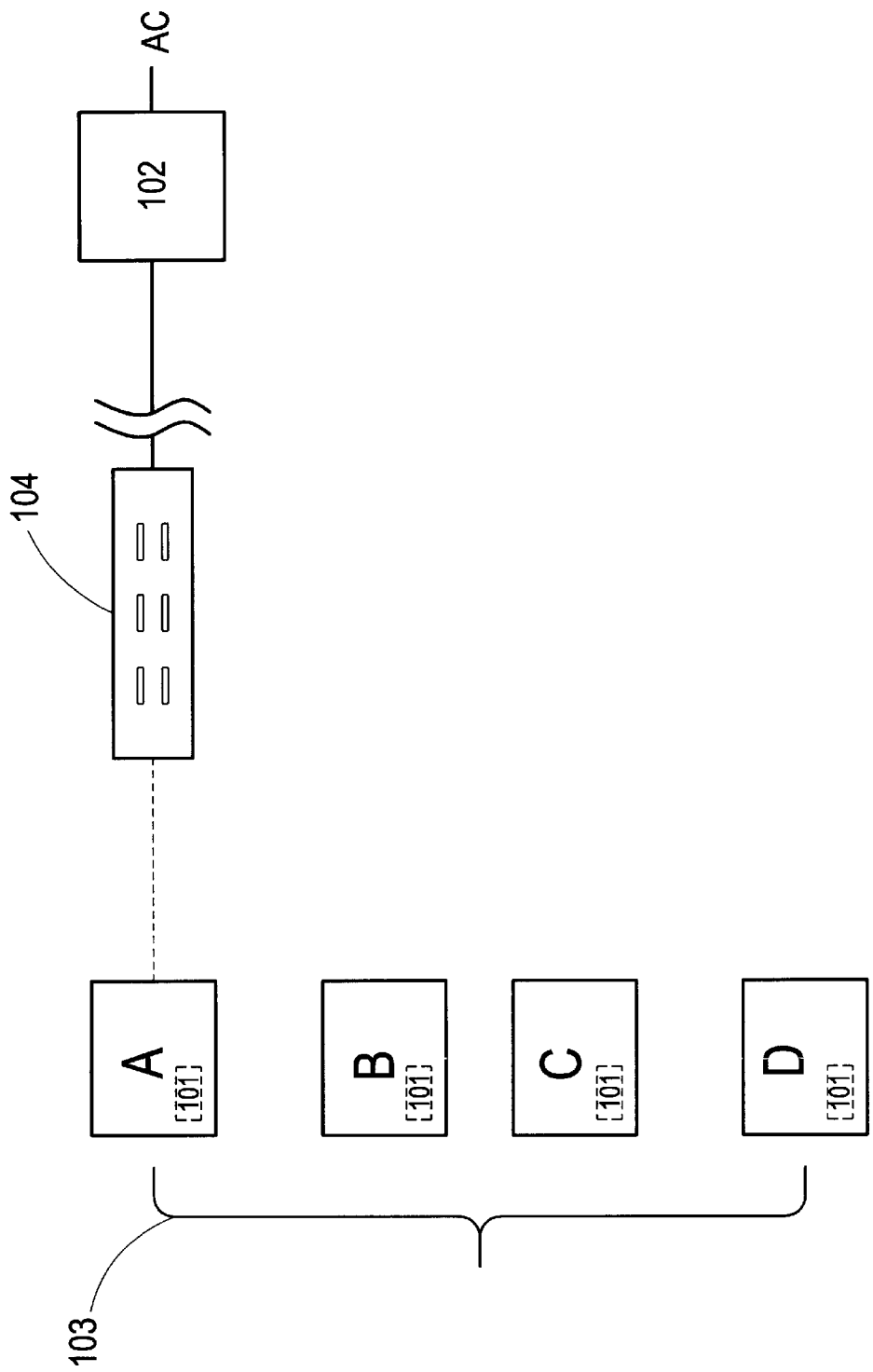

101 Power receiving end
102 Power supply end
103 Electric appliance
104 Socket
201 Overload detector
202 Power circuit
203 Microprocessor
204 Signal dividing circuit
205 Electromagnetic switch B
206 Power line
207 Low power supply
208 Power circuit
209 Microprocessor
210 Signal dividing circuit
211 Electromagnetic switch A
212 Electromagnetic switch C
301 Output a safe low voltage
302 Discern if the safe low voltage is overloaded
303 Turn off the safe low voltage 304 Delayed time
305 Discern the code
306 Turn off the safe low voltage and start AC output
307 Identify the code
308 Turn off AC output
309 Discern if AC is overloaded
401 Microprocessor start
402 Send a code
403 Discern the code
404 Turn on the power of the electric appliance and transmit the code to the power supply end
405 Discern if the code requires being modified
406 Modify the code

DETAILED DESCRIPTION OF THE PREFERRED EMBODIMENT

Referring to FIG. 1A, which is the schematic diagram of the power lock device for safe power output/input provided from the present invention, with the coded circuit in the power receiving end 101 and the decoded circuit in the power supply end 102, the power lock device controls if alternating current is transmitted to the power receiving end 101 of the socket 104 and supply every electric appliances 103 for operation. For application, a power supply end can be connected with several power receiving ends such that control of different groups can be achieved. Besides, a power adaptor containing an input end and an output end can be made from the present invention.

Referring to FIG. 1B, which is the other schematic diagram of the power lock device for safe power output/input provided from the present invention, the power receiving end 101 can be set inside the electric appliance 103 directly such that control of usage of the electric appliance 103 can be achieved.

Figure 2:
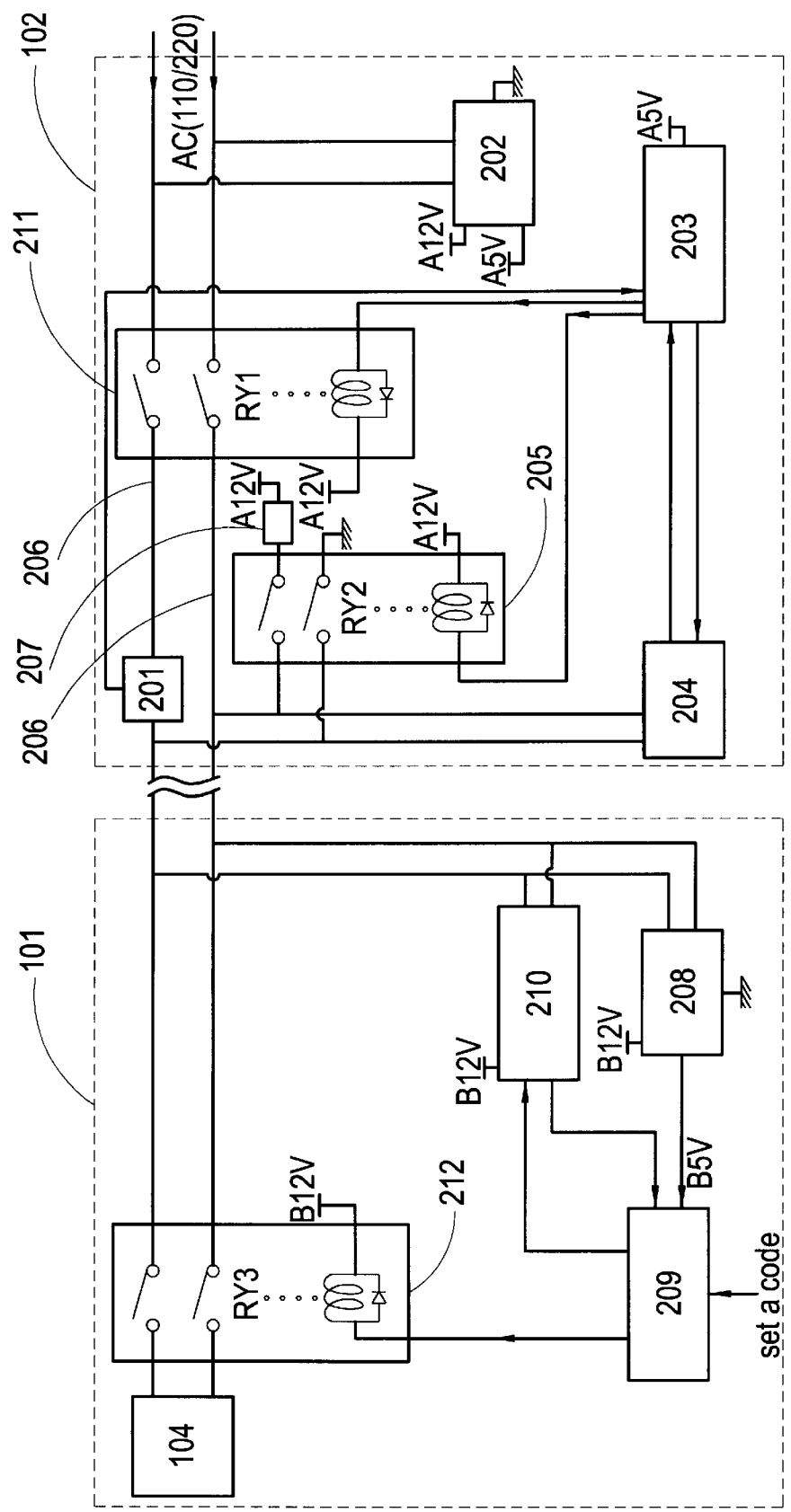
FIG. 2 Circuit diagram of the present invention.

Referring to FIG. 2, which is the circuit diagram of the power lock for safe power output/input, the power supply end 102 therein contains: an overload detector 201, a power circuit 202, a microprocessor 203, a signal dividing circuit 204, and a low power supply 207. The function of the power circuit 202 is to transform alternating current into direct current, which is supplied to the components requiring direct current.

The function of the overload detector 201 is to detect if there is an overload in the power line 206 and transmit the result of detecting to the microprocessor 203.

The function of the low power supply 207 is to output a safe low voltage to the power line 206 to supply the power receiving end 101 for usage.

One function of the signal dividing circuit 204 is to analyze the coded signal attached to the power line 206 and transmits the coded signal, which has been analyzed, to the microprocessor to contrast. The other function of the signal dividing circuit 204 is to attach the coded signal from the microprocessor 203 to the power line 206.

The function of the microprocessor 203 is to receive the signal from the overload detector 201 and discern if the code is correct such that the electromagnetic switch A211 and the electromagnetic switch B205 can be controlled. Besides, the codes to be discerned can be more than one.

The power receiving end 101 comprises a power circuit 208, a microprocessor 209, and a signal dividing circuit 210. The function of the power circuit 208 is to transform the power of the power line 206 such that the components in the power receiving end 101 can use the transformed power.

The function of the microprocessor 209 is to set a code, contract a code, and control the electromagnetic switch C212.

One function of the signal dividing circuit 210 is to analyze the coded signal attached to the power line 206 and transmit the coded signal, which has been analyzed, to the microprocessor 208 to contract. The other function of the signal dividing circuit 210 is to attach the coded signal from the microprocessor 208 to the power line 206.

Figure 3:
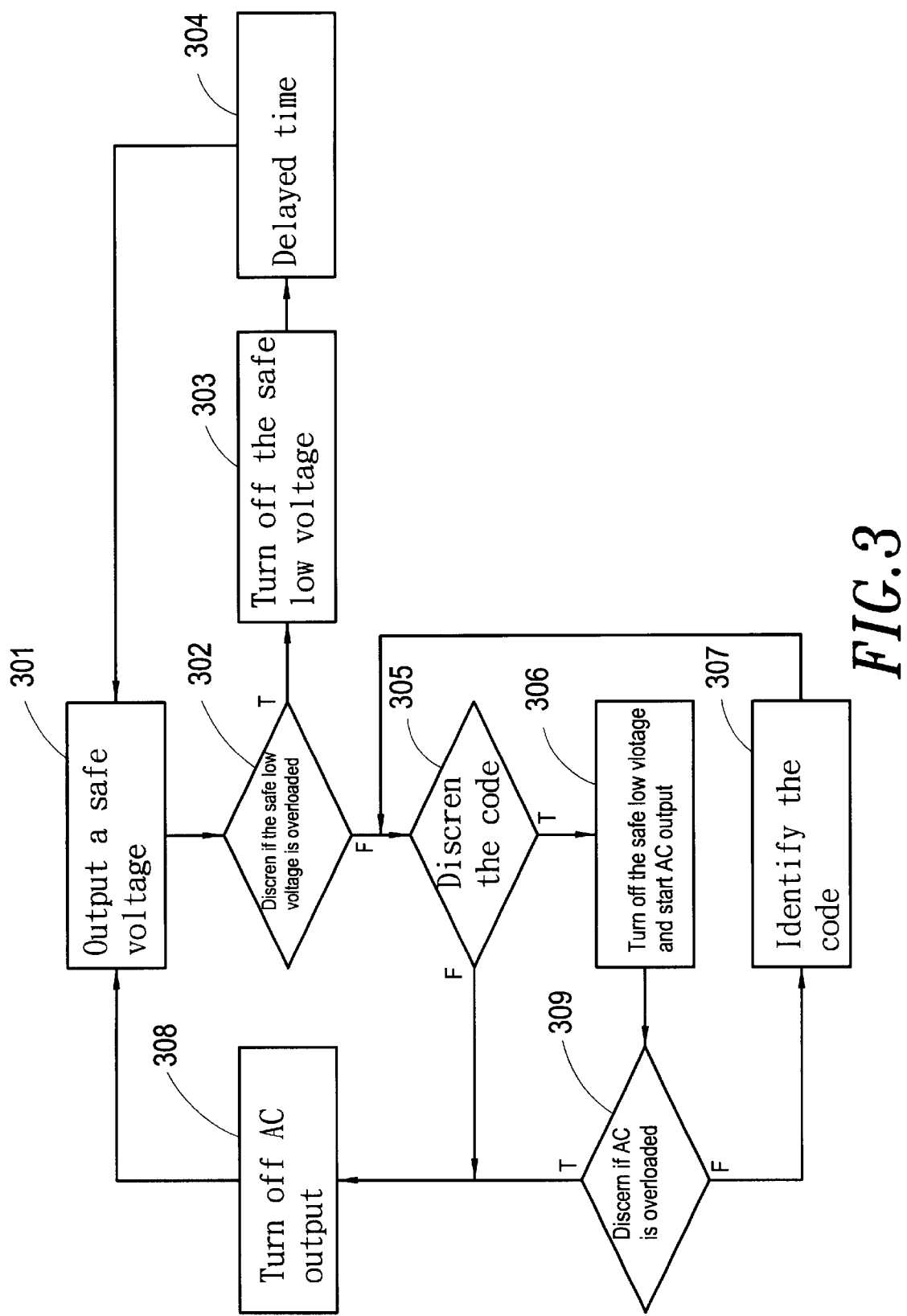
FIG. 3 Flow chart of the power supply end of the present invention.

Referring to FIG. 3, which is the flow chart of the action of the power supply end of the present invention( please refer to FIG. 2 simultaneously), a safe low voltage is outputted first 301 and at this time, the electromagnetic switch A211 is OFF while the electromagnetic switch B205 is ON. Second step is to discern if the safe low voltage is overloaded 302. If the safe low voltage is overloaded, it is turned off 303 and the electromagnetic switch A211 and the electromagnetic switch B205 are OFF at this time. After a period of delayed time 304, the safe low voltage is outputted again. If the safe low voltage is not overloaded, the next step is to discern if the code is correct 305. If the code is not correct, AC output is turned off 308 and the safe low voltage is outputted such that the electromagnetic switch A211 is OFF while the electromagnetic switch B205 is ON at this time. If the code is correct, the safe low voltage is turned off and AC output is turned on 306 such that the electromagnetic switch A211 is ON while the electromagnetic switch B205 is OFF at this time. Next step is to discern if AC is overloaded 309. If AC is overloaded, AC output will be turned off 308 and the electromagnetic switch A211 and the electromagnetic switch B205 are OFF at this time. If AC is not overloaded, the code will be identified 307 and sent for discerning 305.

Figure 4:
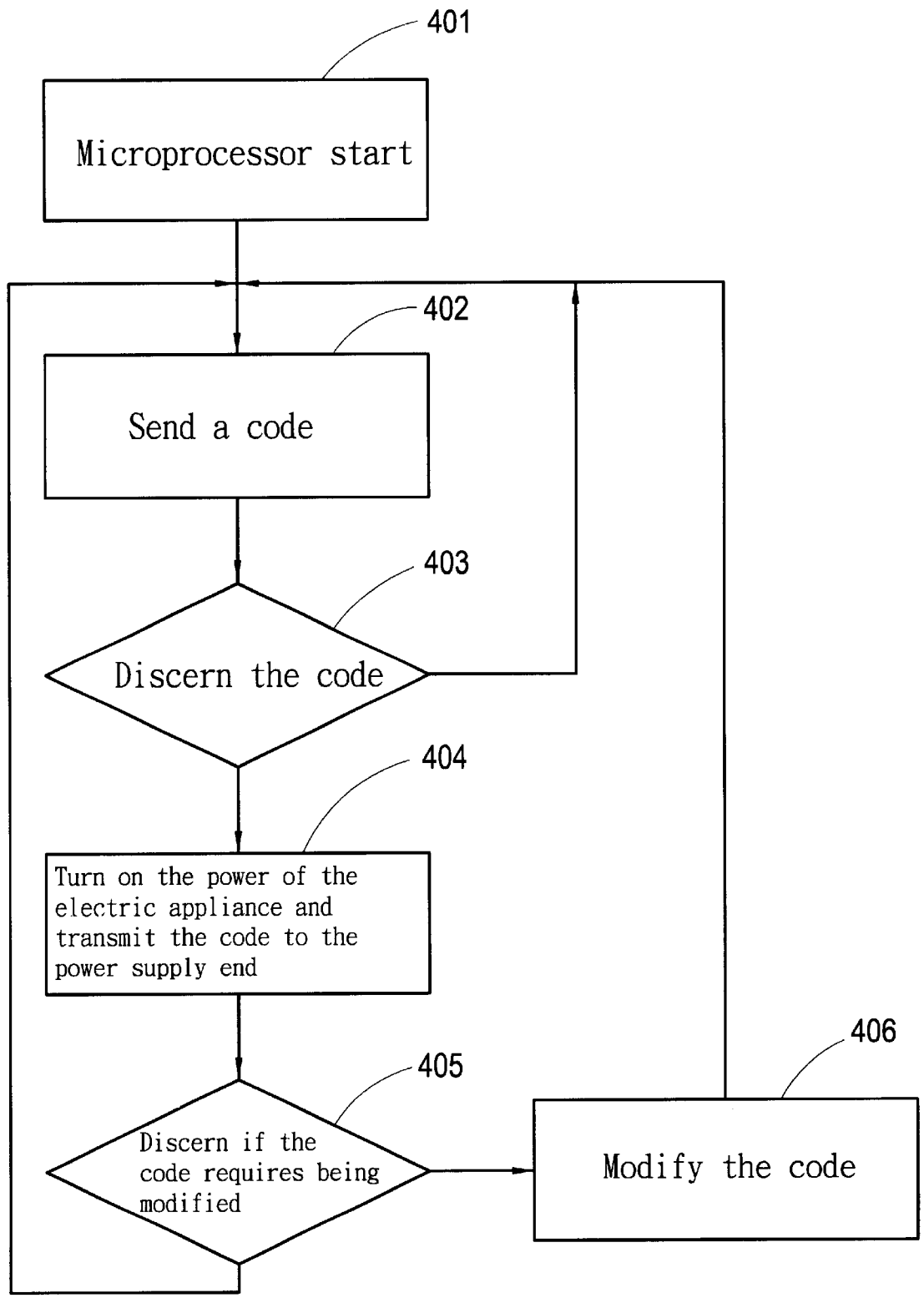
FIG. 4 Flow chart of the power receiving end of the present invention

Referring to FIG. 4, which is the flow chart of action of the power receiving end of the present invention (please refer to FIG. 2 simultaneously), the microprocessor starts 401, and the electromagnetic switch C212 is OFF. Then, the code is sent 402 to discern 403 and if the code is incorrect, the code will be sent again 402. If the code is correct, the power of the electric appliance is turned on and the code is transmitted to the power supply end 404 such that the electromagnetic switch C212 is ON. The next step is to discern if the code require being modified 405. If the code doesn't require been modified, the code keeps on sending. If the code require been modified, the modification of the code is executed 406 and the code is sent 402 after it is modified.

Comparing with the cited case and another commonly seen technology described above, the power lock device for safe power output/input, which is provided from the present invention, has following advantages:

1. The present invention is to provide a power lock for safe power output/input and can avoid the accident of an overload or an electric shock resulted from that the user insert an electric conductor into the socket.
2. The present invention is to provide a power lock for safe power output/input and can immediately cut off power of the socket while an electric appliance is separated from the socket such that the function of the power lock is achieved.
3. The present invention is to provide a power lock for safe power output/input such that the condition that an electric appliance is moved haphazardly can be avoided and the danger electric appliances under using can be limited to some certain places.

Many changes and modifications in the above described embodiment of the invention can, of course, be carried out without departing from the scope thereof. Accordingly, to promote the progress in science and the useful arts, the invention is disclosed and is intended to limited only by the scope of the appended claims.

What is claimed is:

1. A power lock device for safe power output/input, comprising:

a power supply end for contrasting a code and controlling whether said power supply end transmits power or not; and a power receiving end sending said code to said power supply end to contract;

a method for supplying power to said power receiving end from said power supply end, comprising the steps of:

a. said power supplying end waiting for said code of said power receiving end and providing a safe low voltage to said power receiving end for operation, and b. supplying power to said power receiving end if said power supply end receives said code from said power receiving end is correct, whereby power is supplied to said power receiving end and from said power supply end.

2. A power lock device for safe power output/input as recited in claim 1, wherein the power supply end comprises:

a first power circuit transforming alternating current into direct current for supplying components requiring direct current; and a overload detector for detecting whether said first power circuit has an overload or not and transmitting a signal to a first microprocessor when there is said overload in said first power circuit; and a low power supply for outputting a safe low voltage to components of said power receiving end; and a first signal dividing circuit for detecting a first coded signal attached to said first power circuit by analog or digital regulation to check whether an electric appliance is under using or not and transmitting said first coded signal, which has been analyzed, to said first microprocessor to contrast and attaching a second coded signal from said first microprocessor to said first power circuit; and said first microprocessor mentioned above for receiving and contracting said first and second codes from said overload detector and said first signal dividing circuit and controlling transmission of power.

3. A power lock device for safe power output/input as recited in claim 1, wherein said power receiving end comprises:

a second power circuit for transforming alternating current into direct current to supply components of said power receiving end; and a second signal dividing circuit for detecting said second coded signal attached to said power line by analog or digital regulation to check whether said electric appliance is under using or not and transmitting said second analyzed coded signal to a second microprocessor to contrast and moreover, attaching said first coded signal from said second microprocessor to said power line; and said second microprocessor mentioned above for setting and contracting said first and said second codes and moreover, controlling transmission of power.

4. A power lock device for safe power output/input as recited in claim 1, wherein said power receiving end can be set inside an electric appliance.

5. A power lock device for safe power output/input as recited in claim 2, wherein a plurality of codes to be contracted by said first microprocessor of said power supply end can be more than one set.

6. A power lock device for safe power output/input as recited in claim 1 can be made a power adaptor having an input end and an output end.

* * * * *